United States Patent
Dowe et al.

(10) Patent No.: US 8,647,551 B2
(45) Date of Patent: Feb. 11, 2014

(54) PROCESS FOR PRODUCING MOLDINGS WITH AN INCREASE IN THE MELT STIFFNESS

(75) Inventors: Andreas Dowe, Borken (DE); Rainer Goering, Borken (DE); Martin Himmelmann, Haltern am See (DE); Sonja Bollmann, Haltern am See (DE); Franz-Erich Baumann, Duelmen (DE); Roland Wursche, Duelmen (DE)

(73) Assignee: Evonik Degussa GmbH, Essen (DE)

(*) Notice: Subject to any disclaimer, the term of this patent is extended or adjusted under 35 U.S.C. 154(b) by 1173 days.

(21) Appl. No.: 11/354,114

(22) Filed: Feb. 15, 2006

(65) Prior Publication Data
US 2006/0183869 A1 Aug. 17, 2006

(30) Foreign Application Priority Data
Feb. 15, 2005 (DE) .................. 10 2005 007 034

(51) Int. Cl.
C08F 283/04 (2006.01)
C08L 77/00 (2006.01)
B29C 49/00 (2006.01)

(52) U.S. Cl.
USPC .............. 264/209.1; 264/209.6; 264/211.24; 264/239; 264/331.19; 428/35.7; 428/36.9; 525/420; 525/433

(58) Field of Classification Search
USPC ......... 264/209.1, 209.6, 211.24, 239, 331.19; 428/35.7, 36.9; 525/420, 433
See application file for complete search history.

(56) References Cited

U.S. PATENT DOCUMENTS

| | | | |
|---|---|---|---|
| 5,250,619 A * | 10/1993 | Heinz et al. ................. | 525/92 B |
| 5,405,936 A | 4/1995 | Mumcu et al. | |
| 5,425,817 A | 6/1995 | Mugge et al. | |
| 5,668,242 A | 9/1997 | Simon et al. | |
| 5,932,687 A | 8/1999 | Baumann et al. | |
| 6,060,550 A | 5/2000 | Simon et al. | |
| 6,149,836 A | 11/2000 | Mumcu et al. | |
| 6,300,413 B1 | 10/2001 | Simon et al. | |
| 6,316,537 B1 | 11/2001 | Baumann et al. | |
| 6,335,101 B1 | 1/2002 | Haeger et al. | |
| 6,498,217 B1 * | 12/2002 | Marek et al. ................ | 525/433 |
| 6,500,554 B2 | 12/2002 | Gahlmann et al. | |
| 6,579,581 B2 | 6/2003 | Bartz et al. | |
| 6,589,606 B2 | 7/2003 | Waterkamp et al. | |
| 6,656,997 B2 | 12/2003 | Baumann et al. | |
| 6,677,015 B2 | 1/2004 | Himmelmann et al. | |
| 6,766,091 B2 | 7/2004 | Beuth et al. | |
| 6,784,227 B2 | 8/2004 | Simon et al. | |
| 6,884,485 B2 | 4/2005 | Baumann et al. | |
| 7,005,481 B1 * | 2/2006 | Lehmann et al. ............ | 525/433 |
| 2003/0114636 A1 | 6/2003 | Schiffer et al. | |
| 2003/0124281 A1 | 7/2003 | Ries et al. | |
| 2004/0086735 A1 | 5/2004 | Monsheimer et al. | |
| 2004/0097636 A1 | 5/2004 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204531 A1 | 10/2004 | Baumann et al. | |
| 2004/0206443 A1 | 10/2004 | Monsheimer et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 * | 2/2005 | Wursche et al. ............. | 525/340 |
| 2006/0183869 A1 | 8/2006 | Dowe et al. | |
| 2006/0223928 A1 | 10/2006 | Monsheimer et al. | |
| 2006/0244169 A1 | 11/2006 | Monsheimer et al. | |
| 2007/0055044 A1 | 3/2007 | Simon et al. | |
| 2007/0182070 A1 | 8/2007 | Monsheimer et al. | |
| 2007/0238056 A1 | 10/2007 | Baumann et al. | |
| 2007/0260014 A1 | 11/2007 | Simon et al. | |
| 2008/0116616 A1 | 5/2008 | Monsheimer et al. | |

(Continued)

FOREIGN PATENT DOCUMENTS

| | | |
|---|---|---|
| CA | 2 372 986 A1 | 11/2000 |
| DE | 103 37 707 A1 | 4/2005 |
| WO | WO 00/66650 | 11/2000 |

OTHER PUBLICATIONS

U.S. Appl. No. 10/590,935, filed Aug. 28, 2006, Monsheimer, et al.

(Continued)

Primary Examiner — Ana Woodward
(74) Attorney, Agent, or Firm — Oblon, Spivak, McClelland, Maier & Neustadt, L.L.P.

(57) ABSTRACT

A process for producing moldings with condensing-up of a polyamide molding composition whose polyamide component contains, as a result of the method of preparation, at least 5 ppm of phosphorus in the form of an acidic compound by means of a compound having at least two carbonate units, wherein a) from 0.001 to 10% by weight, based on the polyamide, of a salt of a weak acid is added to the polyamide molding composition prior to compounding or during compounding, b) a mixture of the finished composition and the compound having at least two carbonate units is prepared, c) the mixture is, if appropriate, stored and/or transported and d) the mixture is subsequently processed to produce the molding, with the condensing-up occurring only in this step, effects a significant increase in the melt stiffness combined with moderate processing pressures, which considerably simplifies, in particular, the production of hollow bodies and hollow profiles having large diameters.

14 Claims, No Drawings

(56) References Cited

U.S. PATENT DOCUMENTS

| | | |
|---|---|---|
| 2008/0119632 A1 | 5/2008 | Baumann et al. |
| 2008/0166496 A1 | 7/2008 | Monsheimer et al. |
| 2008/0242782 A1 | 10/2008 | Hager et al. |
| 2008/0258346 A1 | 10/2008 | Simon et al. |
| 2008/0300353 A1 | 12/2008 | Monsheimer et al. |
| 2009/0088508 A1 | 4/2009 | Monsheimer et al. |

OTHER PUBLICATIONS

U.S. Appl. No. 10/592,952, filed Sep. 15, 2006, Monsheimer, et al.
U.S. Appl. No. 11/561,021, filed Nov. 17, 2006, Simon, et al.
U.S. Appl. No. 13/729,280, filed Dec. 28, 2012, Pawlik, et al.
U.S. Appl. No. 13/640,552, filed Oct. 11, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
U.S. Appl. No. 13/202,338, filed Aug. 19, 2011, Dowe, et al.

\* cited by examiner

PROCESS FOR PRODUCING MOLDINGS WITH AN INCREASE IN THE MELT STIFFNESS

The present invention relates to a process for producing moldings with an increase in the melt stiffness in the processing of polyamides which contain a phosphorus-containing catalyst as a result of the method of preparation.

Polyamides are macromolecules which comprise the group —CO—NH— in the main chain. They are obtained either from two different bifunctional monomer building blocks which each have two identical reactive groups, e.g. —NH$_2$ or —COOH, or from uniform bifunctional building blocks which each bear or can form an amino group and a carboxyl group. Polyamides are, for example, prepared by polycondensation reactions of diamines with dicarboxylic acids or of aminocarboxylic acids or by ring-opening polymerization of lactams.

In general, polyamides are prepared by a two-stage process for applications which require a high melt stiffness. Here, a comparatively low-viscosity prepolymer is firstly prepared in a pressure reactor, as described, for example, in the Kunststoff-Handbuch, volume 3/4 Technische Thermoplaste, Polyamide; edited by Becker, Braun; Carl Hanser Verlag, 1998. As catalyst, use is advantageously made of a phosphorus-containing compound having protic acidity, e.g. $H_3PO_2$, $H_3PO_3$ or $H_3PO_4$. These compounds can also be used in the form of their precursors, e.g. esters; the latter are converted by hydrolysis into the abovementioned free acids under the reaction conditions. Further examples of compounds suitable as catalysts are organophosphonic acids or organophosphinic acids or their precursors. Apart from improved lactams cleavage at low temperatures, which also leads to a low residual lactams content, the presence of this catalyst effects an improvement in the color of the corresponding polycondensates; the polycondensation reaction is accelerated overall. The effects of the catalyzing compounds naturally also extend to polyamides which contain no laurolactam but instead other monomers. The preproduct which is obtained in this way in the first reaction stage is subsequently brought to the required final molecular weight by reaction of the remaining end groups, for example by means of a solid-state after-condensation. The high molecular weight polyamide obtained is normally admixed with additives such as conductivity additives, stabilizers, plasticizers, nucleating agents, processing aids, colorants, etc.; the molding composition obtained in this way is then employed where an increased melt stiffness is necessary, inter alia in parison extrusion, in blow molding or in thermoforming. However, a disadvantage is that the increase in the molecular weight to the required level requires a long reaction time or residence time, so that additional process costs are incurred.

WO 00/66650 describes the use of compounds having at least two carbonate units for condensing-up polyamides. Here, the properties can be set reliably and stably and it becomes possible to carry out multiple processing of the condensed-up material without gel formation or inhomogeneities occurring. An additive based on this principle for setting the molecular weight of polyamides is marketed by Brüggemann KG under the name Brüggolen M1251. Primary applications are in the field of setting the viscosity of recycled PA6 or PA66 which is reused in molding compositions for extrusion. The additive Brüggolen M1251 is a masterbatch of a low-viscosity polycarbonate, for example Lexan 141, in an acid-terminated PA6. A reaction of the amino end groups present in the material to be condensed up with the polycarbonate is responsible for the increase in molecular weight.

The effectiveness of the method is demonstrated in WO 00/66650 for the example of the condensing-up of PA6 and PA66, with some of the corresponding polycondensates being used in pure form but some of them also containing additives such as glass fibers and montanate.

It has, however, surprisingly been found that the method described in WO 00/66650 does not lead to an increase in the molecular weight in the case of many polyamides, for example PA12, copolyamides based thereon, PA11, PA612 or alicyclic polyamides. It can be demonstrated that a reaction of the amino end groups with the additive which is necessary to achieve this does not occur. It is therefore an object of the invention to discover a modified process which makes it possible for the molecular weight of the materials to be increased reliably and simply in a single-step process during compounding even for these and similar polyamides for which the method of increasing the molecular weight described in WO 00/66650 does not function.

It has surprisingly been found that the problems mentioned occur when a phosphorus-containing compound having protic acidity is used as catalyst in the preparation of the polyamide and that in this case the problems can be alleviated by adding the base corresponding to a weak acid in the form of a salt, with a salt of a weak acid advantageously being added. A similar process is described in the German patent application number 103 37 707.7 of Aug. 16, 2003, which is not a prior publication and is hereby expressly incorporated by reference.

The invention accordingly provides a process for producing moldings with condensing-up of a polyamide molding composition whose polyamide component contains, as a result of the method of preparation, at least 5 ppm and in particular from 20 to 500 ppm of phosphorus in the form of an acidic compound by means of a compound having at least two carbonate units, wherein a) from 0.001 to 10% by weight, based on the polyamide, of a salt of a weak acid is added to the polyamide molding composition prior to compounding or during compounding, b) a mixture of the finished composition and the compound having at least two carbonate units is prepared, c) the mixture is, if appropriate, stored and/or transported and d) the mixture is subsequently processed to produce the molding, with the condensing-up occurring only in this step.

It has surprisingly been found that when this mode of addition during processing is employed, a significant increase in the melt stiffness occurs, combined with moderate processing pressures and a low load on the motor. Thus, high throughputs can be achieved in processing despite a high melt viscosity, which results in an improvement in the economics of the production process.

A polyamide which is suitable for the purposes of the invention is based on lactams, aminocarboxylic acids, diamines and/or dicarboxylic acids. It can further comprise building blocks which effect branching and are derived, for example, from tricarboxylic acids, triamines or polyethylenimine. Suitable types are, in each case as homopolymer or copolymer, for example PA6, PA46, PA66, PA610, PA66/6, PA6/6T, PA66/6T and also, in particular, PA612, PA1010, PA1012, PA1212, PA613, PA1014, PA11, PA12 or a transparent polyamide. Possible transparent polyamides are, for example:

the polyamide derived from terephthalic acid and the isomer mixture of 2,2,4- and 2,4,4-trimethylhexamethylenediamine, the polyamide derived from isophthalic acid and 1,6-hexamethylenediamine, the copolyamide derived from a mixture of terephthalic acid/isophthalic acid and 1,6-hexamethylenediamine, the copolyamide derived from isophthalic acid, 3,3'-dimethyl-4,4'-diaminodicyclohexylmethane and laurolactam or caprolactam, the (co)polyamide derived from 1,12-dodecanedioic acid, 3,3'-dimethyl-4,4'-diaminodicyclohexylmethane and, if appropriate, laurolactam or caprolactam, the copolyamide derived from isophthalic acid, 4,4'-diaminodicyclohexylmethane and laurolactam or caprolactam, the polyamide derived from 1,12-dodecanedioic acid and 4,4'-diaminodicyclohexylmethane, the copolyamide derived from a terephthalic acid/isophthalic acid mixture, 3,3'-dimethyl-4,4'-diaminodicyclohexylmethane and laurolactam.

Further suitable polyamides are polyetheramides based on lactams, aminocarboxylic acids, diamines, dicarboxylic acids and polyether diamines and/or polyether diols.

The starting compounds preferably have molecular weights $M_n$ of greater than 5000, in particular greater than 8000. Here, use is made of polyamides whose end groups are at least partly present as amino groups. For example, at least 30%, at least 40%, at least 50%, at least 60%, at least 70%, at least 80% or at least 90% of the end groups are present as amino end groups. The preparation of polyamides having a relatively high amino end group content using diamines or polyamines as regulators is prior art. In the present case, an aliphatic, cycloaliphatic or araliphatic diamine having from 4 to 44 carbon atoms is preferably used as regulator in the preparation of the polyamide. Suitable diamines are, for example, hexamethylenediamine, decamethylenediamine, 2,2,4- or 2,4,4-trimethylhexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'dimethyldicyclohexylmethane, 4,4'-diaminodicyclohexylpropane, isophoronediamine, meta-xylylidenediamine or para-xylylidenediamine.

In a further preferred embodiment, a polyamine is used as regulator and at the same time branching agent in the preparation of the polyamide. Examples of such polyamines are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]-1,2-ethanediamine, dendrimers and polyethylenimines, in particular branched polyethylenimines, which are obtainable by polymerization of aziridines (Houben-Weyl, Methoden der Organischen Chemie, volume E20, pages 1482-1487, Georg Thieme Verlag Stuttgart, 1987) and generally have the following amino group distribution:

from 25 to 46% primary amino groups,
from 30 to 45% secondary amino groups and
from 16 to 40% tertiary amino groups.

In the process of the invention, at least one compound having at least two carbonate units is used in a ratio of from 0.005 to 10% by weight, based on the polyamide used. This ratio is preferably in the range from 0.01 to 5.0% by weight, particularly preferably in the range from 0.05 to 3% by weight. The term "carbonate" as used here refers to esters of carbonic acid, in particular with phenols or alcohols.

The compound having at least two carbonate units can be a low molecular weight compound or an oligomer or polymer. It can consist entirely of carbonate units or can have further units. These are preferably oligomeric or polymeric amide, ester, ether, ether-ester-amide or ether-amide units. Such compounds can be prepared by known oligomerization or polymerization processes or by polymer-analogous reactions.

In a preferred embodiment, the compound having at least two carbonate units is a polycarbonate, for example a polycarbonate based on bisphenol A, or a block copolymer comprising such a polycarbonate block.

The introduction of the compound having at least two carbonate units which is used as additive in the form of a masterbatch makes it possible to meter the additive more precisely, since relatively large amounts are used. In addition, it has been found that the use of a masterbatch results in an improved extrudate quality being achieved. The masterbatch preferably comprises the polyamide which is to be condensed up in the process of the invention or a polyamide compatible therewith as matrix material, but incompatible polyamides can also experience partial attachment to the polyamide to be condensed up under the reaction conditions, which effects compatibilization. The polyamide used as matrix material in the masterbatch preferably has a molecular weight $M_n$ of greater than 5000, in particular greater than 8000. Preference is here given to polyamides whose end groups are predominantly present as carboxylic acid groups. For example, at least 80%, at least 90% or at least 95% of the end groups are present as acid groups.

The concentration of the compound having at least two carbonate units in the masterbatch is preferably from 0.15 to 50% by weight, particularly preferably from 0.2 to 25% by weight and very particularly preferably from 0.3 to 15% by weight. Such a masterbatch is prepared in the customary manner known to those skilled in the art.

Suitable compounds having at least two carbonate units and suitable masterbatches are comprehensively described in WO 00/66650, which is hereby expressly incorporated by reference.

For the purposes of the present invention, it is necessary for the polyamide to comprise a phosphorus-containing compound having protic acidity in the form of an active polycondensation catalyst which can be added either in this form or in the form of precursors which form the active catalyst under the reaction conditions, or its downstream products. The phosphorus content is determined in accordance with DIN EN ISO 11885 by means of ICP-OES (inductively coupled plasma optical emission spectrometry), but can also be determined, for example, by AAS (atomic absorption spectroscopy). It should be noted that other phosphorus-containing compounds can additionally be present in molding compositions, for example as stabilizers. In this case, the determination of the phosphorus originating from the polycondensation is carried out by a difference method. The sample preparation is then matched to the respective objective.

The salt of a weak acid presumably displays the effectiveness according to the invention because it suppresses the damaging action of the phosphorus compounds present. The $pK_a$ of the weak acid is 2.5 or above, preferably 3.0 or above and particularly preferably 3.5 or above. Suitable weak acids are, for example, selected from among carboxylic acids such as monocarboxylic acids, dicarboxylic acids, tricarboxylic acids, hydroxycarboxylic acids, aminocarboxylic acids, phenols, alcohols and CH-acid compounds.

In addition, salts of inorganic weak acids, for example carbonates, hydrogencarbonates, phosphates, hydrogenphosphates, hydroxides, sulfites are also suitable, with suitable metals being, for example, alkali metals, alkaline earth metals, metals of main group III or metals of transition group II. Organic cations, for example ammonium ions which are fully or partially substituted by organic radicals, are in principle also suitable as cation.

Furthermore, it is also possible to use salts of weak acids which are part of macromolecular structures, for example in the form of ionomers of the Surlyn® type (DuPont) or fully or partially saponified oxidation products of polyethylene wax.

Mention may be made by way of example of the following salts: aluminum stearate, barium stearate, lithium stearate, magnesium stearate, potassium oleate, sodium oleate, calcium laurate, calcium montanate, sodium montanate, potassium acetate, zinc stearate, magnesium stearate, calcium hydroxide, magnesium hydroxide, sodium phenoxide trihydrate, sodium methoxide, calcium carbonate, sodium carbonate, sodium hydrogencarbonate, trisodium phosphate and disodium hydrogenphosphate.

The salt of a weak acid is preferably used in an amount of from 0.001 to 5% by weight, particularly preferably from 0.01 to 2.5% by weight and very particularly preferably from 0.05 to 1% by weight, in each case based on the polyamide.

The customary additives used in the production of polyamide molding compositions can also be used in the process of the invention. Illustrative examples are colorants, flame inhibitors and retardants, stabilizers, fillers, surface slip improvers, mold release agents, impact modifiers, plasticizers, crystallization accelerators, antistatics, lubricants, processing aids and also further polymers which are customarily compounded with polyamides.

Examples of these additives are as follows:

Colorants: titanium dioxide, white lead, zinc white, liptones, antimony white, carbon black, iron oxide black, manganese black, cobalt black, antimony black, lead chromate, red lead, zinc yellow, zinc green, cadmium red, cobalt blue, Berlin blue, ultramarine, manganese violet, cadmium yellow, Schweinfurt green, molybdenum orange and red, chromium orange and red, iron oxide red, chromium oxide green, strontium yellow, molybdenum blue, chalk, ochre, umbra, green earth, calcined Terra di Siena, graphite or soluble organic dyes.

Flame inhibitors and flame retardants: antimony trioxide, hexabromocyclododecane, tetrachlorobisphenol or tetrabromobisphenol and halogenated phosphates, borates, chloroparaffins and red phosphorus, also stannates, melamine cyanurate and its condensation products such as melam, melem, melon, melamine compounds such as melamine pyrophosphate or polyphosphate, ammonium polyphosphate, aluminum hydroxide, calcium hydroxide and organophosphorus compounds which contain no halogens, for example resorcinol diphenyl phosphate or phosphonic esters.

Stabilizers: metal salts, in particular copper salts and molybdenum salts and also copper complexes, phosphites, sterically hindered phenols, secondary amines, UV absorbers and HALs.

Fillers: glass fibers, glass spheres, ground glass fibers, kieselguhr, talc, kaolin, clays, $CaF_2$, aluminum oxides and carbon fibers.

Surface slip improvers and lubricants: $MoS_2$, paraffins, fatty alcohols and fatty acid amides.

Mold release agents and processing aids: waxes (montanates), montanic acid waxes, montanic ester waxes, polysiloxanes, polyvinyl alcohol, $SiO_2$, calcium silicates and perfluoropolyethers.

Plasticizers: BBSA, POBO.

Impact modifiers: polybutadiene, EPM, EPDM, HDPE, acrylate rubber.

Antistatics: carbon black, carbon fibers, graphite fibrils, polyhydric alcohols, fatty acid esters, amines, acid amides, quaternary ammonium salts.

Further polymers: ABS, polypropylene.

These additives can be used in the customary amounts known to those skilled in the art.

The salt of the weak acid can be added at any point in time. For example, it can be introduced into the primary melt after the end of the polycondensation, for instance directly into the polycondensation reactor or into the discharge extruder. It can also be applied to the polyamide pellets before compounding, e.g. in a hot mixer or a tumble dryer. Another possibility is to add the salts together with the additives during compounding. In all cases, the salt can be added as such or as a masterbatch.

According to the invention, the compound having at least two carbonate units is added as such or as a masterbatch only after compounding, but at the latest during processing. The polyamide or polyamide molding composition to be condensed up is preferably mixed as pellets with the pelletized compound having at least two carbonate units or the corresponding masterbatch during processing. However, a pellet mixture of the previously compounded polyamide molding composition with the compound having at least two carbonate units or the masterbatch can also be produced, subsequently transported or stored and then processed. Correspondingly, powder mixtures can naturally also be employed. The critical aspect is that the mixture is not melted before processing. Thorough mixing of the melt during processing is advisable. The masterbatch can, however, equally well be metered as a melt stream with the aid of an auxiliary extruder into the melt of the polyamide molding composition to be processed and then mixed in thoroughly.

The moldings produced according to the invention are preferably hollow bodies or hollow profiles, in particular ones having large diameters, for example gas pipes, offshore pipelines, supply lines, cable conduits, filling station supply lines, ventilation lines, air intake pipes, tank filling ports, storage vessels and fuel tanks. Their external diameter is preferably at least 30 mm, particularly preferably at least 60 mm and especially preferably at least 110 mm, while their wall thickness is preferably at least 1 mm, particularly preferably at least 3 mm, especially preferably at least 6 mm and very particularly preferably at least 10 mm. Such moldings can be produced, for example, by extrusion, coextrusion or blow molding including suction blow molding, 3-D blow molding, parison insertion and parison manipulation processes. These processes are prior art.

The wall of these hollow bodies or hollow profiles can consist of a single layer and in this case consist entirely of the molding composition used according to the claims or can consist of a plurality of layers, with the molding composition used according to the invention being able to form the outer layer, the inner layer and/or the middle layer. The other layer or layers comprise molding compositions based on other polymers, for example polyethylene, polypropylene, fluoropolymers, or metal, for example steel. For example, offshore pipelines usually have a multilayer structure; they generally comprise a steel structure which is protected against media by polymer layers both on the inside and on the outside of the pipe.

The invention is illustrated by way of example below. The following materials were used in the experiments:

Amine-regulated PA12 having 50 meq/kg of $NH_2$ groups and 9 meq/kg of COOH groups, $\eta_{rel}$ about 2.15. Contains 54.5 ppm of phosphorus as a result of the method of preparation.

Acid-regulated PA12 having 8 meq/kg of $NH_2$ groups and 50 meq/kg of COOH groups, $\eta_{rel}$ about 2.15. Contains 54.5 ppm of phosphorus as a result of the method of preparation.

Brüggolen® M1251, a mixture of low-viscosity polycarbonate and an acid-terminated PA6.

Ceasit® PC (Calcium stearate).

The compositions indicated in table 1 were produced on a Werner & Pfleiderer ZSK 30 twin-screw extruder.

COMPARATIVE EXAMPLES A TO C AND EXAMPLE 1

The starting materials indicated in table 2 were processed starting from pellets or a pellet mixture on a 50 mm Reifenhäuser single-screw extruder having a three-zone screw and L=25 D and extruded as pipes having a wall thickness of 2.9 mm and an external diameter of 32 mm. It can be seen from a comparison of comparative example C with example 1 that a significantly lower motor load was necessary according to the invention to produce a molding from a very high molecular weight polyamide.

When the composition C is used directly, $\eta_{rel}$ (as a measure of the molecular weight) decreases from an initial 2.55 to 2.30 (comparative example C) due to chain degradation under shear. No such chain degradation is found in the process according to the invention (example 1).

TABLE 1

Production of the compositions

| | Composition A | Composition B | Composition C | Batch 1 | Batch 2 |
|---|---|---|---|---|---|
| Amine-regulated PA12 [% by weight] | 60 | 59.9 | 99.3 | 99.9 | 0 |
| Acid-regulated PA12 [% by weight] | 40 | 40 | 0 | 0 | 98.4 |
| Brüggolen M1251 [% by weight] | 0 | 0.6 | 0.6 | 0 | 1.5 |
| Ceasit PC [% by weight] | 0 | 0 | 0.1 | 0.1 | 0.1 |
| Throughput [kg/h] | 10 | 10 | 10 | 10 | 10 |
| Shear rate [l/min] | 250 | 250 | 250 | 250 | 250 |
| Melt temperature [° C.] | 251 | 250 | 259 | 249 | 251 |
| Melt pressure [bar] | 33 | 32 | 62 | 35 | 34 |
| Motor power [%] | 73 | 75 | 96 | 78 | 72 |
| $\eta_{rel}$ in accordance with DIN EN ISO 307 | 2.11 | 2.10 | 2.55 | 2.10 | 2.12 |

TABLE 2

Processing to produce pipes

| | Composition A | Composition B | Composition C | Example 1 |
|---|---|---|---|---|
| Composition A [% by weight] | 100 | 0 | 0 | 0 |
| Composition B [% by weight] | 0 | 100 | 0 | 0 |
| Composition C [% by weight] | 0 | 0 | 100 | 0 |
| Batch 1 [% by weight] | 0 | 0 | 0 | 60 |
| Batch 2 [% by weight] | 0 | 0 | 0 | 40 |
| Shear rate [1/min] | 37 | 37 | 37 | 37 |
| Takeoff speed [m/min] | 2.3 | 2.3 | 2.3 | 2.3 |
| Melt temperature [° C.] | 242 | 243 | 255 | 247 |
| Melt pressure [bar] | 58 | 57 | 97 | 119 |
| Motor power [%] | 66 | 66 | 94 | 70 |
| $\eta_{rel}$ in accordance with DIN EN ISO 307 | 2.08 | 2.07 | 2.30 | 2.51 |

The invention claimed is:

1. A process for producing a molded article having a hollow body, comprising:
   preparing a mixture of a first molding composition comprising a polyamide component and a second molding composition comprising a compound having at least two carbonate units, without permitting condensing-up of the polyamide component by the compound having at least two carbonate units and without permitting the first molding composition and the second molding composition to melt, during preparation of the mixture; and
   feeding the mixture into an extruder configured to form the molded article having the hollow body and operating the extruder under conditions that cause condensing-up of the polyamide molding composition by the compound having at least two carbonate units to produce the molded article having the hollow body;
   wherein:
   the polyamide component comprises a polyamide in which at least 50% of end groups are amino end groups;
   the polyamide component comprises at least 5 ppm of phosphorus in the form of an acidic compound;
   the polyamide component is modified with a salt of a weak acid in an amount of from 0.001 to 10% by weight, based on a total weight of the polyamide component; and
   the molded article has an external diameter of at least 30 mm and a wall thickness of at least 3 mm.

2. The process as claimed in claim 1, wherein the polyamide component comprises from 20 to 500 ppm of phosphorus in the form of an acidic compound.

3. The process as claimed in claim 1, wherein the polyamide component is modified with a salt of a weak acid in an amount of from 0.001 to 5% by weight, based on a total weight of the polyamide component.

4. The process as claimed in claim 1, wherein the polyamide component is modified with a salt of a weak acid in an amount of from 0.01 to 2.5% by weight, based on a total weight of the polyamide component.

5. The process as claimed in claim 4, wherein the weak acid has a pKa of 2.5 or above.

6. The process as claimed in claim 4, wherein the salt of a weak acid is an alkali metal salt, an alkaline earth metal salt, a salt of a metal of main group III, a salt of a metal of transition group II or an ammonium salt.

7. The process as claimed in claim 1, wherein the polyamide component is modified with a salt of a weak acid in an amount of from 0.05 to 1% by weight, based on a total weight of the polyamide component.

8. The process as claimed in claim 1, wherein the first molding composition comprises a polyamide prepared using a diamine or polyamine as regulator.

9. The process as claimed in claim 1, wherein the second molding composition is a masterbatch comprising the compound having at least two carbonate units.

10. A molded article having a hollow body obtained by the process of claim 1.

11. The molding as claimed in claim 10, wherein the molded article is in the form of a gas pipe, an offshore pipeline, a supply line, a cable conduit, a filling station supply line, a ventilation line, an air intake pipe, a tank filling port, a storage vessel or a fuel tank.

12. The molded article as claimed in claim 10, wherein a wall of the molded article has a multilayer structure.

13. The process as claimed in claim 1, wherein
preparing the mixture of the first molding composition and the second molding composition comprises combining pellets of the first molding composition and pellets of the second molding composition.

14. A process for producing a molded article having a hollow body, comprising:
feeding a melt stream of a first molding composition and a melt stream of a second molding composition into an apparatus configured to form the molded article having the hollow body; and
operating the apparatus to produce the molded article having the hollow body;

wherein:

the first molding composition comprises a polyamide component;

the second molding composition comprises a compound having at least two carbonate units;

the polyamide component comprises a polyamide in which at least 50% of end groups are amino end groups;

the polyamide component comprises at least 5 ppm of phosphorus in the form of an acidic compound;

the polyamide component is modified with a salt of a weak acid in an amount of from 0.001 to 10% by weight, based on a total weight of the polyamide component; and the molded article has an external diameter of at least 30 mm and a wall thickness of at least 3 mm.

* * * * *